May 17, 1949.　　　　J. M. STEIN ET AL　　　　2,470,663
THREE-LAYER SINGLE-PHASE WINDING
Filed Aug. 28, 1947
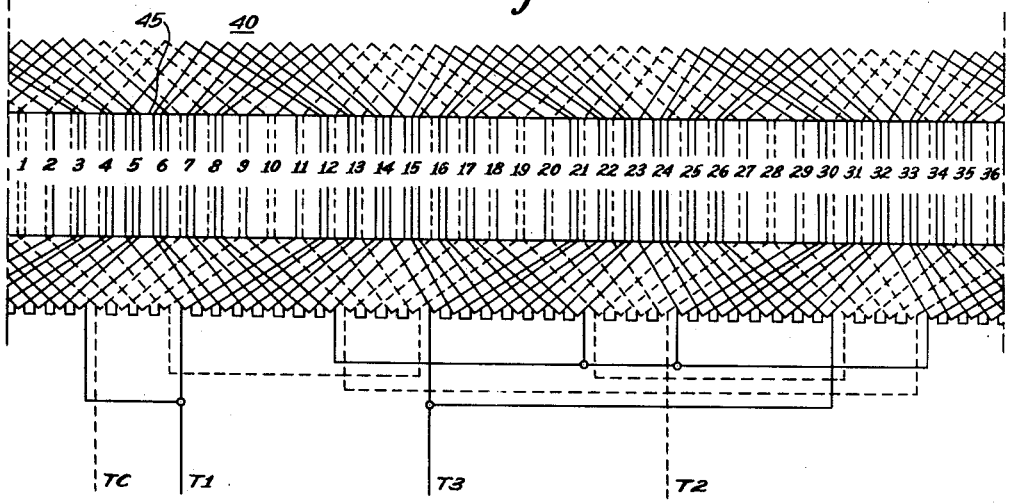
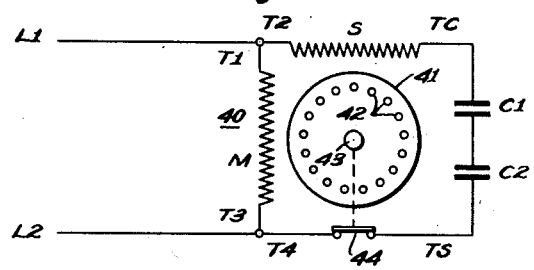
WITNESSES:
Robert C. Baird
Nw. C. Groome
INVENTORS
Joseph M. Stein and
Robert W. Egglestone.
BY O.B.Buchanan
ATTORNEY Patented May 17, 1949

2,470,663

UNITED STATES PATENT OFFICE 2,470,663

THREE-LAYER SINGLE-PHASE WINDING

Joseph M. Stein and Robert W. Egglestone, Buffalo, N. Y., assignors to Westinghouse Electric Corporation, East Pittsburgh, Pa., a corporation of Pennsylvania Application August 28, 1947, Serial No. 771,044

12 Claims. (Cl. 318—221)

Our invention relates to a line of single-phase capacitor-start squirrel-cage motors which uses the same frame-parts and stator-punchings as a corresponding line of polyphase motors. In order to accomplish this purpose, it has been necessary to devise some sort of primary winding other than the concentric windings heretofore commonly used for single-phase motors.

Concentric single-phase windings have been used heretofore, for the purpose of producing a magneto-motive force with a minimum harmonic content, i. e., to produce an approximately sinusoidal ampere-turn distribution. The past practice, in winding single-phase motors, has been to use four different sizes of coils, of successively smaller pitch, the successive coils having turn-numbers in the ratio 3:2.6:2:1, from the coil having the smallest pitch to the coil having the largest pitch.

A concentric winding necessarily has coils of a plurality of different pitches, and it also has a plurality of different numbers of turns in each coil, making the winding-cost rather large. A concentric winding also involves long-end turns, which use up more copper and make the winding have a higher resistance. Other disadvantages of the concentric type of winding include the inability to wind the coils on simple automatic coil-winding machinery, the difficulty in placing the coils in the stator-slots due to the stiffness of the coils having the smallest pitch, and the relatively great bulk of the coil-extensions or end-turns. Notwithstanding these disadvantages, the necessity for approximating a sinusoidal flux-distribution has so far militated against the general use of any other kind of windings, other than the concentric windings, for single-phase motors.

Our new line of general-purpose squirrel-cage motors, designed with the specific purpose of achieving greater economies, by using the same parts for both polyphase and single-phase motors, as far as possible, has necessitated an abandonment of the previous practice of using concentric coils for the single-phase windings, because there simply was not room to use such windings.

It is an object of our present invention to provide a three-layer lap-winding for single-phase motors, or a winding using preformed coils, all of which are identical with each other, i. e., all of which have the same pitch and the same number of turns in the coil. The pitch or chording is especially chosen, preferably having a value of two-thirds pitch, so that the completed main winding of the motor will approximate a sinusoidal flux-distribution sufficiently closely, by having one, two, or three main-winding coil-sides in the various slots, as needed, so as to approximate a sinusoidal ampere-turn distribution, such as 1:2:2:3:3:2:2:1, for the main winding.

A further object of our invention is to provide a starting winding which is similar to the main winding, except that it has a smaller number of coils, disposed in slots which do not have three main-winding coil-sides in them.

A differently stated object of our invention is to provide a novel kind of primary winding for single-phase motors, comprising main and starting windings which may be wound with automatic winding-equipment and resulting in a primary winding wherein some of the slots have two layers or coil-sides of main or starting windings therein, but wherein most of the slots have three winding-layers or coil-sides therein; the total bulk or volume occupied by the primary winding being such that the single-phase motor may utilize, in general, the same stator-punchings, and the same frame-parts and end-bells, as the correspondingly rated motors in a corresponding polyphase line of motors; thereby producing a single-phase motor which takes advantage of manufacturing economies resulting from the relatively large volume of business in the polyphase line of motors, while at the same time, achieving a reduced winding-cost for the single-phase windings.

With the foregoing and other objects in view, our invention consists in the machines, systems, combinations, parts and methods of manufacture and operation, hereinafter described and claimed, and illustrated in the accompanying drawing, wherein:

Figure 1 is a developed diagrammatic representation of the main and starting primary windings of a single-phase, one-H. P., 60-cycle, four-pole, 1740-R. P. M. capacitor-start squirrel-cage motor, which is shown by way of example, and Fig. 2 is a diagrammatic view of the motor, showing its terminal-connections.

The illustrated embodiment of a single-phase induction-motor includes a stationary primary member 40 and a rotor-member 41. The rotor-member is a squirrel-cage member, as shown in Fig. 2, having a squirrel-cage winding 42. It is mounted on a shaft 43 which carries a centrifugal switch 44 which is initially closed, but which opens, in response to the motor-speed, before the motor reaches its full speed during the starting-operation.

The stationary primary member, as shown in Fig. 1, has a stator-core 45 having thirty-six winding-receiving slots therein, which are numbered consecutively from 1 to 36 in Fig. 1. The main winding M and the starting winding S have coil-sides which are disposed in the slots of the stator-core, as shown in Fig. 1, the bottom or lowermost coil-side in each slot being the first or left-hand coil-side in the slot, as shown in Fig. 1, while the top coil-side is shown at the right-hand side of each slot in Fig. 1. The main-winding coils M are shown in full lines, in Fig. 1, while the starting-winding coils S are shown in dotted lines.

The main winding M is preferably a lap-winding. It is composed of coils which are all identical with each other, and which all have the same number of turns per coil. A special feature of the main winding is that it is a three-layer winding, having one, two, or three main-winding coil-sides in the various slots, in such manner as to approximate a sinusoidal ampere-turn distribution.

The starting-winding S is a similar winding of smaller wire, with a smaller number of coils, and more turns per coil, disposed in slots which do not have three main-winding coil-sides in them.

In order to give a concrete example of a motor embodying our invention, without intending to limit ourselves to any particular motor, it may be noted that the particular motor which has been chosen for illustration of the invention is a four-pole motor having thirty-six stator-slots, or nine stator-slots per pole. In this particular motor, there are eight main winding coils M per pole, having 23 turns per coil; and there are four starting-winding coils S per pole, having 31 turns per coil. The disposition or arrangement of the main and starting coil-sides M and S in the various stator-slots is shown in the following tabulation:

| Slot No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Location: | | | | | | | | | | | | | | | | | | | | | | | | | | | | | | | | | | | | |
| Top | S | M | M | M | M | M | M | M | M | S | S | S | M | M | M | M | M | M | S | S | S | M | M | M | M | M | M | S | S | S | M | M | M | M | M | M |
| Center | S | S | M | M | M | M | M | M | S | S | M | M | M | M | M | M | S | S | M | M | M | M | M | M | S | S | M | M | M | M | M | M | S | S | M | S |
| Bottom | | | S | S | M | M | S | S | | | | | M | M | M | M | S | S | | | | M | M | M | M | S | S | | | | M | M | M | M | S | S |

If we designate the various slot-positions of the different coil-sides, by appending the letters B, C and T to the number which represents the slot, to indicate respectively the bottom of the slot, the center of the slot, and the top of the slot; and if we designate the left-hand coil-side of any coil by the letters LH, and the right-hand coil-side by the letters RH, the order of winding-assembly of the primary windings of our illustrated motor will be as follows, starting with the starting-winding coil S having a left-hand coil-side LH lying in the bottom of slot 1, which is indicated as 1-C for the center of the slot, because this is a slot having only two coil-sides therein, when the winding is finished; and having a right-hand coil-side RH in the bottom of slot 7, which is indicated as 7-B:

| | LH | RH | | LH | RH | | LH | RH |
|---|---|---|---|---|---|---|---|---|
| S | 1-C | 7-B | M | 14-T | 20-C | M | 25-T | 31-B |
| S | 2-C | 8-B | M | 15-C | 21-B | M | 26-C | 32-B |
| S | 3-B | 9-C | M | 15-T | 21-C | M | 26-T | 32-C |
| S | 4-B | 10-C | M | 16-C | 22-B | M | 27-T | 33-B |
| M | 5-B | 11-C | M | 16-T | 22-C | S | 28-T | 34-B |
| M | 6-B | 12-C | M | 17-C | 23-B | S | 29-T | 35-B |
| M | 6-C | 12-C | M | 17-T | 23-C | S | 30-T | 36-C |
| M | 7-C | 13-B | M | 18-T | 24-B | S | 31-T | 1-T |
| M | 7-T | 13-C | S | 19-T | 25-B | M | 32-T | 2-T |
| M | 8-C | 14-B | S | 20-T | 26-B | M | 33-C | 3-C |
| M | 8-T | 14-C | S | 21-T | 27-C | M | 33-T | 3-T |
| M | 9-T | 15-B | S | 22-T | 28-C | M | 34-C | 4-C |
| S | 10-T | 16-B | M | 23-T | 29-C | M | 34-T | 4-T |
| S | 11-T | 17-B | M | 24-C | 30-B | M | 35-C | 5-C |
| S | 12-T | 18-C | M | 24-T | 30-C | M | 35-T | 5-T |
| S | 13-T | 19-C | M | 25-C | 31-B | M | 36-T | 6-T |

B=bottom of slot, C=center of slot, T=top of slot.

Our new type of winding, as just described, is proving very successful in a new line of motors in which greater economies are effected, in size, weight, material, and manufacturing-costs, in a new design in which the convertibility-feature is emphasized throughout, namely, the utilization of the same motor-parts, so far as is possible, for single-phase and polyphase motors, and for different types of protected machines, such as drip-proof, splash-proof, totally enclosed, and the like, the convertible-frame feature being described and claimed in a copending application of Ludwig et al., Serial No. 690,628, filed August 15, 1946, and assigned to the Westinghouse Electric corporation.

While our new main primary lap-winding, using uniform pre-wound coils, does not approximate quite as closely to a sinusoidal ampere-turn distribution as was previously accomplished with concentric coils having turn-ratios of 1, 2, 2.6, and 3, whereas we utilize the turn-ratios 1, 2, 2, and 3, experience has shown that our approximation is sufficiently close so that our new motor meets all of the standard commercial requirements for motors of this class.

While all of our stator-slots are not equally full, experience has shown that the incompletely filled slots experience a shifting and re-arrangement of wires in them, and no special filling is needed to take up unfilled spaces.

Besides all of its other advantages, our new primary winding is very much more economical to wind than the previously used concentric windings, in the previous single-phase motors of the type to which our invention applies.

In the operation of our motor, suitable terminal-connections are needed, as partially shown in Fig. 1, and as shown more in detail in Fig. 2. The two supply-line leads are indicated at L1 and L2 in Fig. 2. The line-conductor L1 may be connected, for example (for counterclockwise rotation of the motor), to the main-winding terminal T1 and to the starting-winding terminal T2. The other starting-winding terminal TC may be connected, as shown in Fig. 2, to two serially connected electrolytic capacitors C1 and C2, which are connected, through a terminal-connector TS, to the centrifugal starting-switch 44, and thence to the starting-winding motor-terminal T4. The second line-conductor L2 is connected to the main-winding terminal T3 and to the starting-winding terminal T4, as shown in Fig. 2.

When power is applied to the line-conductors L1 and L2, the motor starts as a two-pole motor, by reason of the fact that the starting-winding S is spatially displaced in quadrature phase-relation, with respect to the main winding M, while the current in the starting-winding is advanced in time-phase, with respect to the current in the main winding, by reason of the capacitors C1 and C2. When the motor approaches sufficiently closely toward its full speed, the starting-switch 44 opens, thereby disconnecting the starting-winding S, so that the motor thereafter continues to pull up to speed, and operates thereafter, with only its main winding M energized. The starting-winding S thus has only a very brief intermittent duty to perform, and hence it is customary to wind the starting-winding S with less copper than the main winding M, and we have continued this practice in our present motor.

While we have illustrated our invention with reference to a single illustrative motor, as being representative of an entire line of motors of different ratings and pole-numbers and speeds, we wish it to be understood that our invention is not limited to the precise details which have been shown and described. We desire, therefore, that our appended claims shall be accorded the broadest construction consistent with their language.

We claim as our invention:

1. A single-phase induction-motor having a stationary primary member and a rotor-member, said stationary primary member having a slotted stator-core and main and starting windings having coil-sides disposed in the slots of the stator-core; said main winding having coils which are all identical with each other, all having the same pitch and the same number of turns per coil, said main winding being also a three-layer winding having one, two or three main-winding coil-sides in the various slots in such manner as to approximate a sinusoidal ampere-turn distribution; and said starting winding being a similar winding of less copper, with a smaller number of coils, and different turns per coil, disposed in slots which do not have three main-winding coil-sides in them.

2. A single-phase capacitor-start squirrel-cage motor, as defined in claim 1, characterized by said rotor-member being a squirrel-cage member, and said starting winding being in a circuit which serially includes a capacitor-means and a starting-switch which opens before the motor attains its full speed during starting.

3. A single-phase self-starting squirrel-cage motor, as defined in claim 1, characterized by said rotor-member being a squirrel-cage member, and said starting winding being in a circuit which serially includes a phase-shifting means and a starting-switch which opens before the motor attains its full speed during starting; the number of stator-core slots being nine per pole, the main-winding pitch being two-thirds of full pitch, the number of main-winding coils being eight per pole, and the numbers of main-winding coil sides in successive slots, for any pole, being 1, 2, 2, 3, 3, 2, 2 and 1, respectively.

4. A single-phase self-starting squirrel-cage motor, as defined in claim 1, characterized by said rotor-member being a squirrel-cage member, and said starting winding being in a circuit which serially includes a phase-shifting means and a starting-switch which opens before the motor attains its full speed during starting; the number of stator-core slots being nine per pole, the main-winding pitch being two-thirds of full pitch, the number of main-winding coils being eight per pole, the numbers of main-winding coil-sides in successive slots, for any pole, being 1, 2, 2, 3, 3, 2, 2 and 1, respectively; and the starting winding having two coil-sides in each of the stator-core slots which has no main-winding coil-sides in it, and having one coil-side in each of the next three stator-core slots on each side of the slot having said two starting-winding coil-sides.

5. An element of a dynamo-electric machine having a slotted core, and a winding having a plurality of substantially identical coils, all spanning the same number of slots and having substantially the same number of turns per coil, the coil-sides of said winding lying in said slots in such manner that a winding-circuit has a graduated number of such coil-sides for each pole, with a minimum number at the edges of the pole, and a maximum number at the central part of the pole, said maximum number of coil-sides being greater than two.

6. The invention as defined in claim 5, characterized by the numbers of coil-sides of said winding-circuit, for any pole, being 1, 2, 2, 3, 3, 2, 2 and 1, respectively.

7. A single-phase induction-motor having a stationary primary member and a rotor-member, said stationary primary member having a slotted stator-core and main and starting windings having coil-sides disposed in the slots of the stator-core; said main winding being a lap-winding having coils which are all identical with each other, all spanning the same number of slots and having the same number of turns per coil, said main winding being also a three-layer winding having one, two or three main-winding coil-sides in the various slots, in such manner as to approximate a sinusoidal ampere-turn distribution; and said starting winding being a similar winding of smaller wire, with a smaller number of coils, and more turns per coil, disposed in slots which do not have three main-winding coil-sides in them.

8. A single-phase capacitor-start squirrel-cage motor, as defined in claim 7, characterized by said rotor-member being a squirrel-cage member, and said starting winding being in a circuit which serially includes a capacitor-means and a starting-switch which opens before the motor attains its full speed during starting.

9. A single-phase capacitor-start squirrel-cage motor, as defined in claim 7, characterized by said rotor-member being a squirrel-cage member, and said starting winding being in a circuit which serially includes a capacitor-means and a starting switch which opens before the motor attains its full speed during starting; the number of stator-core slots being nine per pole, the main-winding pitch being two-thirds of full pitch, the number of main-winding coils being eight per pole, and the members of main-winding coil-sides in successive slots, for any pole, being 1, 2, 2, 3, 3, 2, 2 and 1, respectively.

10. A single-phase capacitor-start squirrel-cage motor, as defined in claim 7, characterized by said rotor-member being a squirrel-cage member, and said starting winding being in a circuit which serially includes a capacitor-means and a starting-switch which opens before the motor attains its full speed during starting; the number of stator-core slots being nine per pole, the main-winding pitch being two-thirds of full pitch, the number of main-winding coils being eight per pole, the numbers of main-winding coil-sides in successive slots, for any pole, being 1, 2, 2, 3, 3, 2, 2 and 1, respectively; and the starting winding having two coil-sides in each of the stator-core slots which has no main-winding coil-sides in it, and having one coil-side in each of the next three stator-core slots on each side of the slot having said two starting-winding coil-sides.

11. An element of a dynamo-electric machine having a slotted core, and a lap-winding having a plurality of substantially identical coils, all spanning the same number of slots and having substantially the same number of turns per coil, the coil-sides of said winding lying in said slots in such manner that a winding-circuit has a graduated number of such coil-sides for each pole, with a minimum number at the edges of the pole, and a maximum number at the central part of the pole, said maximum number of coil-sides being greater than two.

12. The invention as defined in claim 11, characterized by the numbers of coil-sides of said winding-circuit, for any pole, being 1, 2, 2, 3, 3, 2, 2 and 1, respectively.

JOSEPH M. STEIN.
ROBERT W. EGGLESTONE.

REFERENCES CITED

The following references are of record in the file of this patent:

UNITED STATES PATENTS

| Number | Name | Date |
| --- | --- | --- |
| 618,578 | Newcomb | Jan. 31, 1899 |

FOREIGN PATENTS

| Number | Country | Date |
| --- | --- | --- |
| 34,838 | France | May 21, 1929 |
| 386,503 | Great Britain | Jan. 19, 1933 |